Nov. 27, 1951 — J. D. FURBUSH — 2,576,587
FISHING REEL
Filed Sept. 23, 1948
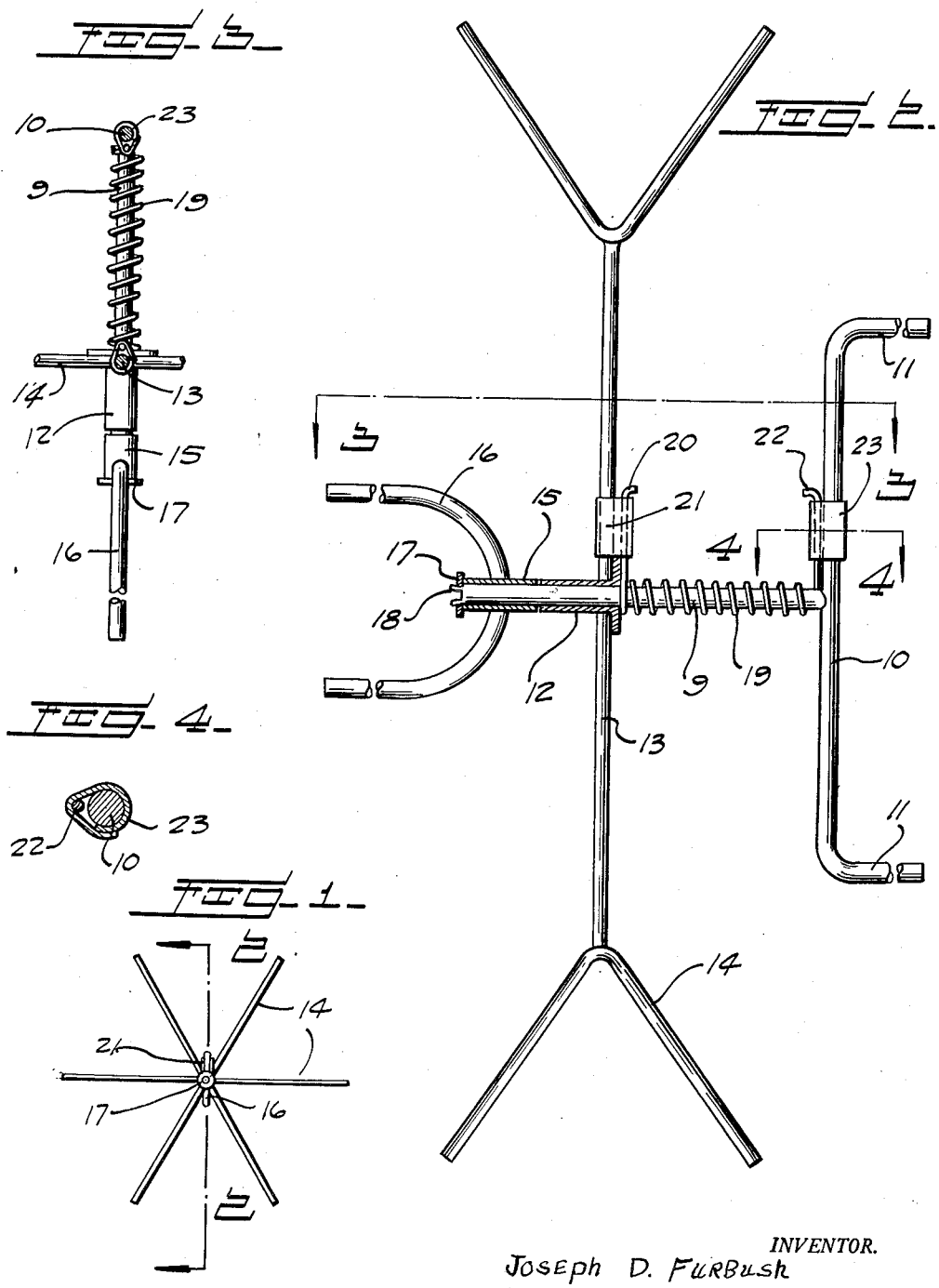
INVENTOR.
Joseph D. Furbush
BY
Thos. S. Donnelly
ATTORNEY.

Patented Nov. 27, 1951

2,576,587

UNITED STATES PATENT OFFICE 2,576,587

FISHING REEL

Joseph D. Furbush, Adrian, Mich.

Application September 23, 1948, Serial No. 50,705

2 Claims. (Cl. 242—104)

My invention relates to a new and useful improvement in a fish line reel and particularly that type of reel which is used without a pole. Such reels may be used for still fishing and the like where it is not necessary to cast out the bait to any great distance. In some types of reels which are used without a pole the spring is used for winding up the reel after it has been released. However, in fishing it is desirable that the fisherman have complete control of the reel and be able to wind it or hold it stationary at will while at the same time there should be a spring effect on the line the same as is obtained when using a spring pole.

It is an object of the invention to provide a fish line reel of this type so arranged and constructed that the line may be wound on the reel by the operator under complete control of the operator while at the same time any sudden pull on the line will be yielded to, thus closely resembling the yieldability which obtains where a flexible pole is used.

Another object of the invention is the provision of a reel of this type which will be simple in structure, economical to manufacture, durable, compact, easily operated and highly efficient in use.

Another object of the invention is the provision of a reel of this type having ample space on which a line may be wound while at the same time the structure may be maintained light and yet quite strong.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which,

Fig. 1 is a front elevational view of the invention,

Fig. 2 is a central, sectional view slightly enlarged taken on line 2—2 of Fig. 1 with parts broken away, Fig. 3 is a view taken on line 3—3 of Fig. 2, Fig. 4 is a sectional view taken on line 4—4 of Fig. 2.

As shown in the drawings the invention comprises a rod 9 which serves as a shaft and at the end of which is attached a bar 10 having the angularly turned ends 11 to provide cranks whereby the rod or shaft 9 may be rotated. This rod 9 projects through the tube 12 which serves as the hub of the reel and radiating outwardly from this hub 12 are the spokes 13 which carry the V-shaped arms 14 at the outer ends to provide a space on which a fish line or other similar flexible body may be wound. The rod 9 also projects through a tube 15 which is securely fastened to a hand grip 16. Positioned on the end of the rod 9 is a washer 17 and the split ends 18 of the rod 9 and upset to hold the washer 17 in position and prevent the withdrawal of the rod 9 from the tube 15.

Embracing the rod 9 is a coil spring 19 having the angularly turned end 20 which is fastened to one of the spokes 13 by means of the clip 21. The opposite end 22 of the spring 19 is also angularly turned and extended to lie in contact with and parallel to the bar 10 to which it is secured by means of the clip 23.

The construction is such that the operator when holding the hand grip 16 in one hand may rotate the reel, by means of the cranks 11, with the other hand. This rotation is effected through the spring 19 as the rod 9 freely turns in the hub 12 and the tube 15. Consequently while the line is being used when fishing should a sudden pull on the reel take effect the reel can reversely rotate against the tension of the spring 19. In this manner the springiness or resiliency of the flexible pole is simulated insofar as the effect of the same on the line is concerned. In this manner I have provided a reel possessing the advantages set forth and it is obvious that the reel may be cheaply manufactured while at the same time it will be light and when properly manufactured of sufficient durability for the purposes.

It will be noted that the relative rotation of the member 10 and the reel is limited by the spring 19, this relative rotation being limited within the limits of distortion of the spring 19.

What I claim as new is:

1. A reel of the class described comprising a rod; a bar mounted on one end of said rod and projecting outwardly therefrom at opposite sides thereof; a crank on said bar; a reel comprising a tubular hub, said rod rotatably projecting through said hub; a hand grip mounted rotatably on said rod; a coil spring embracing said rod between said bar and said reel, the opposite ends of said spring being angularly turned; supporting arms projecting outwardly from said hub; line receiving members carried on the outer ends of said arms; a clip for securing one of the angularly turned ends of said spring to one of said arms; and a clip for securing the other angularly turned end of said spring to said bar.

2. A reel of the class described, comprising: a rod; a reel embodying a line receiving member adapted for receiving a flexible line to be wound thereon, said rod projecting outwardly from opposite sides of said reel; a gripping member mounted on said rod adjacent one end and projecting outwardly radially therefrom; a crank on said gripping member; a gripping member on the opposite end of said rod, at least one of said gripping members being rotatable relatively to said rod; a spring member, one end of said spring member being secured in fixed relation to said crank-bearing gripping member and the opposite end of said spring being secured in fixed relation to said reel for limiting relative rotation of said crank-bearing gripping member and said reel in either direction within the limits of distortion of said spring and for effecting a rotation of said reel upon rotation of said crank-bearing gripping member in either direction.

JOSEPH D. FURBUSH.

REFERENCES CITED

The following references are of record in the file of this patent:

UNITED STATES PATENTS

| Number | Name | Date |
| --- | --- | --- |
| 327,195 | Roberts | Sept. 29, 1885 |
| 734,797 | Austin | July 28, 1903 |
| 1,017,734 | Boss | Feb. 20, 1912 |
| 2,173,126 | Moore | Sept. 19, 1939 |
| 2,214,661 | Darling | Sept. 10, 1940 |
| 2,303,668 | Tilbury | Dec. 1, 1942 |
| 2,463,108 | Jacobson | Mar. 1, 1949 |